United States Patent [19]

Mohan et al.

[11] Patent Number: 5,551,046
[45] Date of Patent: Aug. 27, 1996

[54] METHOD FOR NON-HIERARCHICAL LOCK MANAGEMENT IN A MULTI-SYSTEM SHARED DATA ENVIRONMENT

[75] Inventors: Chandrasekaran Mohan, San Jose; Inderpal S. Narang, Saratoga, both of Calif.

[73] Assignee: International Business Machines Corporation, Armonk, N.Y.

[21] Appl. No.: 271,533

[22] Filed: Jul. 7, 1994

Related U.S. Application Data

[63] Continuation of Ser. No. 715,505, Jun. 14, 1991, abandoned.
[51] Int. Cl.$^6$ ...................................................... G06F 15/00
[52] U.S. Cl. ........................... 395/800; 395/446; 395/468; 395/481; 395/726; 395/728; 395/600; 395/472
[58] Field of Search ................................... 395/800, 650, 395/425, 446, 468, 481, 726, 728, 600

[56] References Cited

U.S. PATENT DOCUMENTS

| | | | |
|---|---|---|---|
| 4,698,752 | 10/1987 | Goldstein et al. | 395/600 |
| 4,965,719 | 10/1990 | Shoens et al. | 395/650 |
| 5,161,227 | 11/1992 | Dias et al. | 395/650 |
| 5,191,652 | 3/1993 | Dias et al. | 395/200.08 |
| 5,220,657 | 6/1993 | Bly et al. | 395/479 |
| 5,226,143 | 7/1993 | Baird et al. | 395/472 |
| 5,237,694 | 8/1993 | Horne et al. | 395/726 |
| 5,276,835 | 1/1994 | Mohan et al. | 395/471 |
| 5,301,290 | 4/1994 | Tetzlaff et al. | 395/469 |

FOREIGN PATENT DOCUMENTS

| | | | |
|---|---|---|---|
| WO9103024 | 3/1991 | WIPO | G06F 15/40 |

OTHER PUBLICATIONS

Communication dated Jun. 30, 1993 re European Search Report, 92305320.1.
3rd Int. Conf on Extending Database Technology 23 Mar. 1992, Springer Verlag, Berlin, Germany, pp. 453–486.
C. Mohan et al., Efficient Locking and Caching of Data in the Multisystem Shared Disks Transaction Environment pp. 453, 459, 462 and 464.
IEEE Transactions on Software Engineering, vol. 15, No. 4, Apr. 1989 New York US pp. 437–447, XP117128.
Daniel M. Dias et al. "Integrated Concurrency–coherency Controls for Multisystem Data Sharing" Abstract, pp. 439 and 443.
16th Int. Conf. on Very Large Databases, Aug. 13, 1990, pp. 122–133.
Wilkinson K., et al., "Maintaining Consistency of Client Cached Data", pp. 122 and 125.
13th Ann. Int. Computer Software & Applications Conf. Sep. 22, 1989, IEEE Comp. Soc. Press, pp. 166–175, XP91501.
Meichun Hsu et al. "Transaction Synchronization in Distributed Virtual Memory Systems", abstract, pp. 167 and 168.

Primary Examiner—Alyssa H. Bowler
Assistant Examiner—John Follansbee
Attorney, Agent, or Firm—Baker, Maxham, Jester & Meador

[57] ABSTRACT

In a combination of multiple concurrently-executing database management systems which share data storage resources, efficient lock processing for shared data is implemented by hiding from a global lock manager the distinction between transaction-interest and cache-interest locks that are processed at the DBMS level. The local lock manager of a DBMS, in response to a request for either type of lock, may issue a request to the global lock manager for a system-level lock without disclosing to the global lock manager the type of lock requested of the local lock manager. After receipt of the system level lock, the local lock manager can grant either transaction or cache interest locks locally on a data resource if the combined mode of locally-held locks on that data resource is greater than or equal to the requested mode.

6 Claims, 5 Drawing Sheets

METHOD FOR NON-HIERARCHICAL LOCK MANAGEMENT IN A MULTI-SYSTEM SHARED DATA ENVIRONMENT

This is a continuation (file wrapper) of application Ser. No. 07/715,505 filed Jun. 14, 1991, now abandoned.

BACKGROUND OF INVENTION

This invention relates to management of non-hierarchical locks that serialize the access of multiple systems to shared data resources.

In U.S. Pat. No. 4,965,719 of Shoens et al, a hierarchical locking scheme is disclosed which serializes the access of a plurality of parallel systems to shared data resources. A lock hierarchy is proposed that requires a transaction to acquire a lock on a data resource's parent before acquiring a lock on the data resource itself. The hierarchical structure requires, for example, that a lock be acquired on a page of data before a lock may be acquired on a record in the page.

Transactions acquire access to data resources through a database management system (DBMS). The DBMS of the Shoens patent includes a transaction manager, a buffer manager, and a resource lock manager. In the Shoens patent, before a transaction-level record lock can be acquired, an inter-system page lock must be acquired by the buffer manager of a DBMS. In this multiple-DBMS system, an interest manager mediates competing requests from buffer managers for a page in order to guarantee coherency of any page buffered from a shared direct access storage device (DASD).

In the prior art system, the first transaction-level request for a record or a page necessitates suspension of the transaction until the local buffer manager has requested and been granted a lock on the page by the interest manager. This is shown more clearly in FIG. 1.

In FIG. 1, when the first transaction request 10 for a data resource (such as a page) is received by a DBMS, a request for the page to the buffer manager reveals that the page is not in the buffer pool and requires the buffer manager to request and acquire a lock 12 on the page from the interest manager. In the meantime, the transaction is suspended until the buffer manager receives the lock and reads the page into the buffer pool. Then the first, and any subsequent transaction requests for locks on the page and for objects on the page are processed 14. When the locks are received, the transactions process the components (records, for instance) of the page at 16. When transaction processing concludes, the transaction locks are released at 18 and the buffer lock at 20. Thus, the lock hierarchy of the prior art multi-system environment requires that step 12 precede step 14 in all cases where the data resource must be buffered for transaction processing.

Prior art methods for inter-system locking in multi-DBMS environments recognize locking modes. In the Shoens et al. patent, the modes are referred to as "Update" and "Share". More recent database management systems recognize lock modalities with more than two possible values. For example, in the DB2 system available from the Assignee, the possible modes of a lock are:

X (Exclusive)

U

S ( Shared )

N (Null:implies that the lock is not held)

The structuring of lock modes implies a magnitude differentiation, in which X>U>S>Null. In the data resource context, an X lock is more restrictive for access to the resource than U-mode and U-mode is more restrictive than mode S. Further, compatability between the U- and S-modes is observed wherein a transaction seeking an S-mode lock on a data resource will not be denied access to the resource if another transaction holds a U-mode lock on the same resource. However, the X-mode is incompatable with all modes (including the X-mode), and any requests for a lock of any magnitude on a data resource for which an X-mode lock is held will be denied.

SUMMARY OF THE INVENTION

The invention reduces the number of lock and unlock requests to a global lock manager as a result of the following observation: a local lock manager ("resource lock manager" in the Shoens et al patent) can hide the distinction between a transaction lock (called an "L lock" ) and a cache-ownership lock (called a "P lock") for the same data resource from the global lock manager (the "interest manager" of Shoens et al). The L and P locks for a data resource, although distinct at a local manager, are observed by the global lock manager as a single lock (called an "LP lock"). The global lock manager knows-about the LP lock with the following owner and lock mode: the owner is a local lock manager; the lock mode is the combined lock modes of all L and P locks maintained by the local lock manager for the data resource. In the invention, a local lock manager can grant an L or P lock on a data resource locally if the combined lock modes of the L and P locks previously granted on the same data resource is equal to or greater than the mode of the requested lock.

In particular, the method of the invention is for locking data resources in a shared data system including multiple database management systems connected to one or more data storage devices and to a global lock manager, the global lock manager receiving and granting requests for locks. In the shared data system, each database management system includes a local lock manager for receiving, processing, and granting requests for an L lock that indicates transaction interest in a data resource and for receiving, processing, and granting requests for a P lock that indicates caching of a data resource for the database management system. In the method:

(a) responsive to receipt of a first request for a lock of either type by a local lock manager for a data resource, the local lock manager transmits to the global lock manager a request for a lock (LP lock) that indicates DBMS interest in the data resource; and (b) upon receipt of a grant of the requested LP lock by the global lock manager, the local lock manager grants the first request.

In this method, locks are granted at least in a first mode (X-mode) denoting update of a data resource, or in a second mode (S-mode) denoting reading of the data resource. In step (a) of the method, the request is transmitted as a request for the LP lock in X-mode if the first request is for updating the data resource, or in S-mode if the first request is for reading the data resource, and the grant received in step (b) is in the mode of the first request. Further in the method:

(c) in response to receipt of a subsequent request for a lock of any type on the data resource, the local lock manager generates a resultant mode of all locks granted for the data resource, the resultant mode corresponding to the highest magnitude mode of any lock granted on the data resource;

(d)(1) if the subsequent request is for a lock with a mode having magnitude greater than the resultant mode, the local lock manager transmits to the global lock manager a request for the LP lock in the requested mode; and (d)(2) upon receipt of a grant of the LP lock in the requested mode, the local lock manager grants the requested lock; otherwise (e) the local lock manager grants the subsequent request without communication with the global lock manager. The principal objective of the invention is to reduce the message traffic between a local lock manager and a global lock manager necessary for acquiring and releasing data resource locks in an environment where a plurality of database management systems access common data storage resources.

The objective is achieved by providing each local lock manager with the ability to obtain a system-level lock on a data resource in response to either an L or a P lock request.

Other objects and important advantages of the invention will become manifest when the following detailed description is read with reference to the below-described drawings.

DETAILED DESCRIPTION OF THE PREFERRED EMBODIMENT

The invention provides a method for operating a general purpose computing environment in which multiple instances of a database management system (DBMS) execute on one or more general purpose computers and share access to data resources. The invention concerns the management of system-level locks, called LP locks, which are "owned" by the local lock management facilities of the DBMS's.

Figure 1:
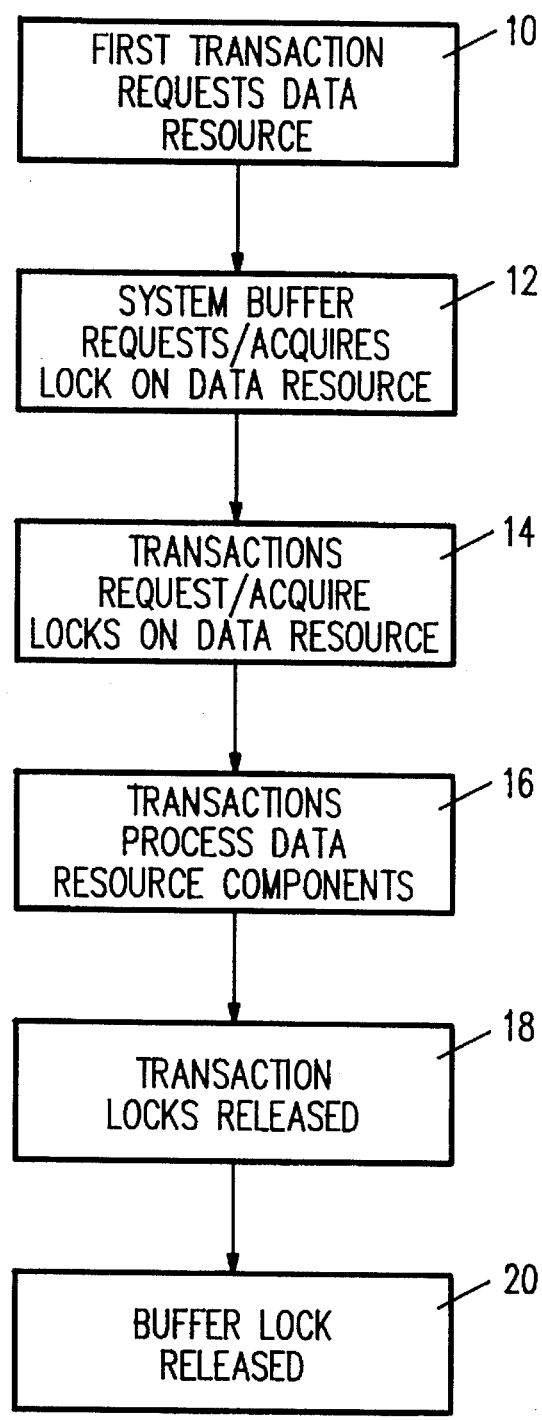
FIG. 1 illustrates a prior art approach for obtaining a system-level lock on a data resource in a multi-system environment.
Figure 2:
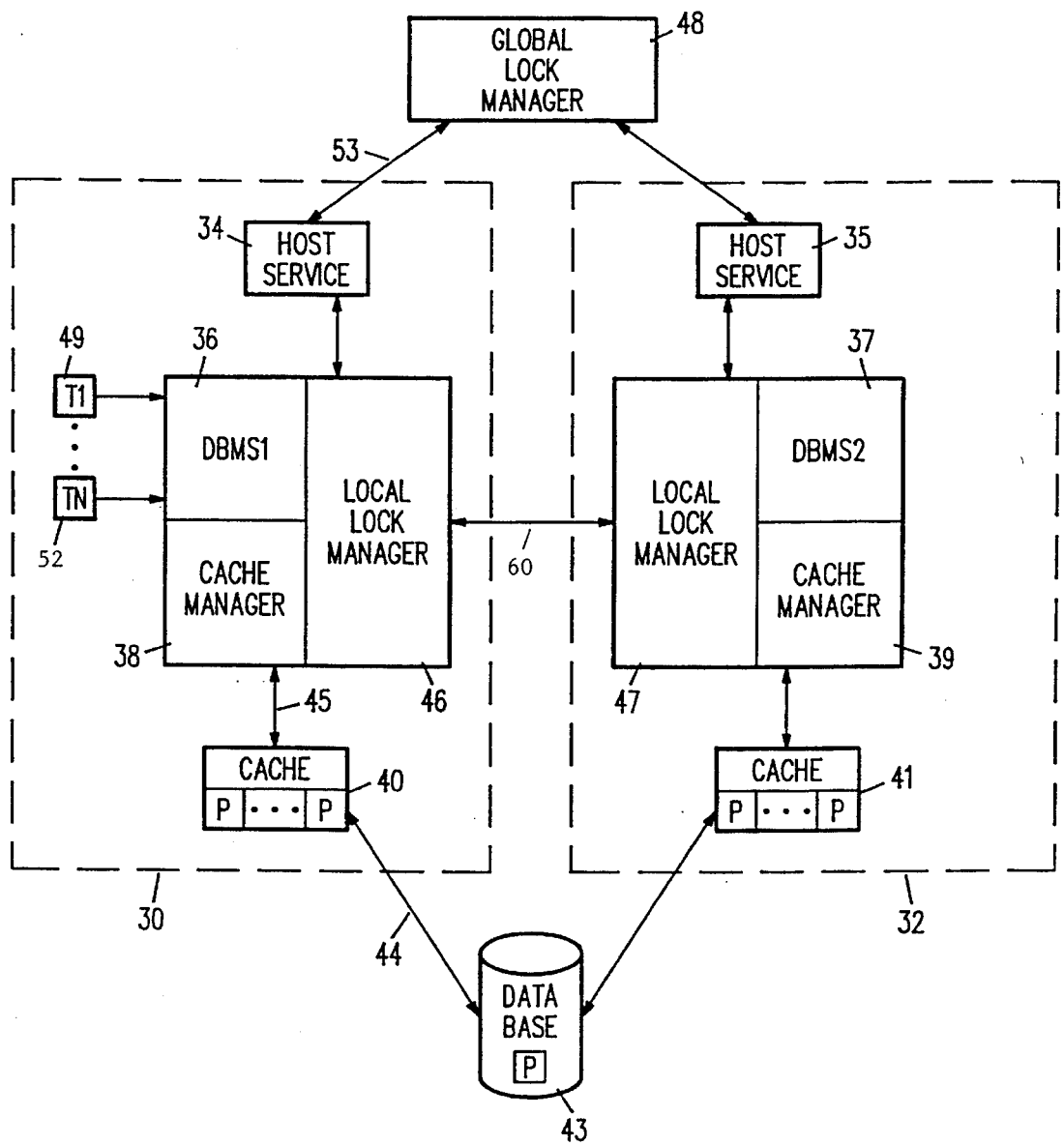
FIG. 2 is a block diagram representation of a typical digital computing system configured for operation according to the invention FIG. 3 hows the data structures in local lock manager and global lock manager for the invention.

FIG. 2 is a representation of a typical environment which may contain up to N digital computer systems 30, 32 (only two being shown for simplicity). Within each computer system is a real or virtual address space, including data storage program areas, that include host operating system services 34 and 35 and at least one database management system (DBMS) per system, respectively, 36 and 37. Each DBMS includes a cache manager 38, 39 which manages a cache 40, 41. (In the prior art, the cache manager and cache are referred to, respectively, as the buffer manager and buffer pool.) The DBMS's 36 and 37 have access in common to one or more databases stored on one or more DASD's (only one DASD 43 is shown for simplicity). Each DBMS also includes a local lock manager (LLM) 46, 47.

Each digital computer system 30, 32 includes a general purpose central processing unit with main storage and virtual storage devices and the necessary channels and peripheral equipment. For example, each may comprise the IBM System/390, which is available from the Assignee. Each digital computer system 30, 32 operates under control of an operating system (not shown) such as the IBM System/390 MVS operating system. DBMS's 36, 37 execute under control of their respective operating systems and utilize the available operating system facilities and other facilities as may be needed for interfacing communications.

Each digital computer system 30, 32 also includes a transaction manager (not shown) such as the IBM IMS/VS or the IBM CICS, that interfaces transactions with the respective database management systems. Each DBMS is capable of interfacing with N transactions. For simplicity, two such transactions 49 and 50 are illustrated interfacing with DBMS 36.

The database management systems can comprise available products such as the DB2 or IMS/VS systems available from the Assignee. It is assumed that the DBMS's 36 and 37 include other functions, such as database recovery control. It is further assumed that abnormal and failure conditions in any of the components illustrated in FIG. 2 are detected and either reported or corrected according to known methods.

In FIG. 2, it is assumed that the two digital computer systems 30 and 32 execute application programs in a multi-programming environment. When a process or transaction, such as the transaction 49, requires access to a data resource, the interfacing transaction manager generates a lock request which is provided to the local lock manager 46. When generated by a transaction, the lock request is called an L lock; therefore, all L-type locks denote transaction interest in a data resource. The lock request may be in a mode which is appropriate to the use to which the transaction will put the requested data resource. Thus, if the transaction intends to alter or update the data resource, coherency requires that it have exclusive access while updating. Thus, its lock request will be submitted in the X-mode. If exclusive access is not required for transaction processing, the lock may be requested in a shared mode, such as U or S. (U mode denotes that the transation may update the resource by acquiring a lock in X-mode. U mode is incompatible with itself. U mode prevents deadlocks between transactions when they try to update the same resource after reading it.)

After acquiring the transaction lock, the DBMS checks its local cache to determine whether the resource resides therein. In the invention, it is assumed that the unit of ownership of a data resource by a transaction is the same as the unit of caching of that resource by the cache manager. For discussion in the invention, it is assumed that the data resource is a page. Thus, a request from transaction 49 for access to a page PN will be submitted to the cache manager 38. The cache manager maintains a directory of cached pages. If the page is not presently in the cache 40, the cache manager 38 will initiate an I/O process to move a copy of the most current version of the page into the cache 40. In many cases, the page will be obtained on the data path 43, 44, 40. It may also be possible for the page to be extracted from another cache, such as the cache 41 via the path 41, 35, 60, 34, 40.

Whenever a page is to be cached, the cache manager 38, 39 submits a lock request to its respective local lock manager 46, 47, the lock being designated a P lock. It is asserted that the cache manager 38, 39 is aware of the purpose for caching the data resource and therefore sets the mode in its lock request to match the mode required to accomplish that purpose. For example, if a transaction has requested access to a page P for the purpose of updating that page, and if the page must be brought into the cache 40, the cache manager 38 will submit a P lock request in the X-mode. Further, it is assumed that a cache manager 38, 39 will employ a prefetching strategy in which a request to bring a page into a cache will result in a limited number of pages (possibly consecutive) being brought in with the requested page. For every prefetched page, a respective P lock will be requested with the mode of the P lock required for the requested page.

In the invention, assume that the designer of a database system will choose a lock mode magnitude relationship in which a plurality of lock modes may be ordered by assigned magnitudes. Using the lock modes described in this invention, the inventors proposed magnitude relationship is: X>S>Null. The magnitude relationship between lock modes does not correspond to the structuring of locks into a hierarchy based upon the data objects to which they pertain. Rather, the correspondence is between the magnitude of a lock mode and the action which is to be performed under the mode on the indicated resource.

When a local lock manager receives either an L or a P lock request, it may communicate with the global lock manager 48 if the requested lock necessitates the obtaining or modification of a system-level LP lock. In this case, for example, the local lock manager 46 will communicate with the global lock manager on data path 52, 53, 48. The data path may include an interfacing channel communication unit (not shown) which may be, for example, an IBM 3088 multi-system channel communication unit.

There is a single global lock manager (GLM) 48 in the environment of FIG. 2 which may execute on its own general purpose digital computer. In order to engage the global lock manager 48 in a procedure for obtaining a lock, each local lock manager 46, 47 establishes a communication session with the global lock manager 48. The global lock manager 48 receives requests for locks from the local lock managers, processes the requests, and grants locks in response to the requests. It is asserted that the local lock managers 46 and 47 also engage the global lock manager 48 in releasing locks which they may hold ("unlocking").

Figure 3:
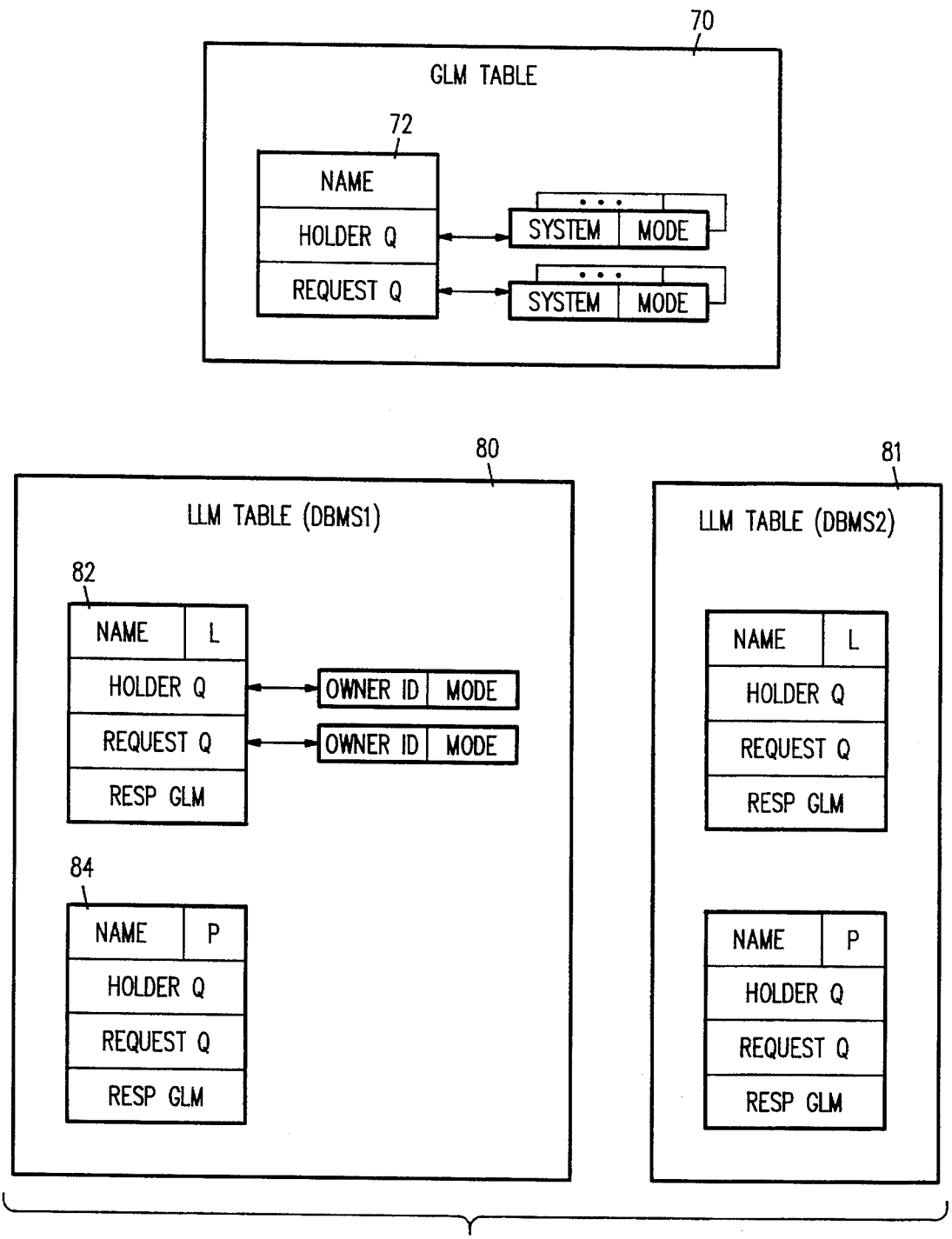

Each lock manager maintains a lock table. FIG. 3 illustrates a global lock manager lock table 70 and local lock manager tables 80 and 81 for local lock managers 46 and 47, respectively. Each lock table includes multi-field entries which assist the owning lock manager in processing, maintaining, and releasing locks. The global table 70 contains entries for LP locks, one such entry being indicated by 72. Each global table entry includes a Name field which identifies the data resource to which the lock applies. For example, an LP lock on page PN has an entry in the Name field which includes the page identifier PN. The Name field may also include other information necessary to the design and operation of an implementing system. The entry 72 also contains a field Mode which contains a value identifying the mode of the lock. Systems which hold the lock are queued in a Holding System(s) field. Systems which have advanced requests for the lock 72 that are incompatible with the mode in which the lock is currently held are placed in a queue anchored in a Requesting Systems field.

The local lock manager tables 80, 81 list by Name all locks which are granted for local transaction and cache interest purposes. For example, the local lock manager table 80 may include all L locks granted to transactions which are served by DBMS 36. A representative L lock entry is denoted by 82. Each L lock entry includes a Name field identifying the data resource for which the lock is obtained. An L field identifies the lock as one satisfying a transaction interest in the named data resource. A Mode field identifies the mode in which L lock is held. H and R fields respectively anchor queues of transactions which hold and transactions which have requested a lock on the named data resource. Last, a field RESP GLM indicates that the local lock manager 46 has sent to the global lock manager a request for an LP lock on the named data resource. P lock entries are represented by the entry 84 which is identical in all respects with the entry 82 with the sole exception that the lock type is identified by a P field which identifies the lock as a P lock.

In respect of receiving and evaluating lock requests, both the global lock manager and local manager employ substantially identical operations. In this regard, when a lock request is received, the request identifies the name of the data resource, the type of lock, and the mode necessary to effect the operation of the requesting process. When a request is transmitted, the requestor suspends operation until receiving a response from the addressed lock manager. If no lock is currently held on the named data resource, the lock manager creates a table entry for the lock having the appropriate format, queues the requestor in the appropriate holding field, and returns a message to the requestor indicating that the lock has been granted. If a request is received for a lock which is currently held, the mode field of the lock entry is compared with the mode of the requested lock. If the modes are compatible, the lock is granted and the requestor is put in the holding queue. If the requests are incompatible, the requestor is queued in the requesting queue.

It is assumed that a lock manager employs unlocking procedures to de-queue holders of locks when the holders request unlocking. When an unlock request is processed, the lock manager will then consult the requesting queue to determine whether any waiting requests can be serviced based on other holders, if any.

In order to permit processing of lock requests according to this invention, the local lock managers rely on a concept termed "resultant mode". In this regard, the resultant mode for lock on a named data resource corresponds to the maximum mode resulting from the union of all locks held on the data resource. In particular, when receiving a lock request for a data resource, the local lock manager will look up the lock table to locate the L and P locks which may be held on the identified data resource. The resultant mode of the existing L and P locks which are in the table is determined by the lock modes in which they are held by the transactions and cache manager of that system. Table I shows the resultant mode of L and P locks on a page.

TABLE I

| No. | L lock | P lock | Resultant Mode of L and P locks |
| --- | --- | --- | --- |
| 1 | Null | Null | Null |
| 2 | Null | S | S |
| 3 | Null | X | X |
| 4 | S | Null | S |
| 5 | S | S | S |
| 6 | S | X | X |
| 7 | X | Null | X |
| 8 | X | S | X |
| 9 | X | X | X |

THE INVENTION

The invention concerns a technique to save messages for transaction locking and cache coherency in a multiple DBMS environment with shared data storage such as that illustrated in FIG. 2. Typically, transaction locking provides serialization to preserve transaction semantics in a multi-system environment. The locking function requires coordination among multiple DBMS's which is done by message exchange between the global lock manager and the local lock managers. The cache manager of a DBMS follows cache coherency protocols to ensure that the DBMS instance in which it is included always uses the current copy of data. Cache coherency protocols also use locking. These protocols depend on whether the DBMS follows a "no-force-at-commit" or a "force-at-commit" policy in the multi-system environment. In this regard, the force-at-commit policy means that an updated data resource will be returned to ("forced to") DASD when the updating transactions commits. In contrast, no-force-at-commit policy does not require that the updated data object be returned to DASD as a condition of committing the updating transaction. Rather, the updated data resource may dwell in a cache after the updating transaction commits. However, this policy does require some means for signalling to other potential using systems that a particular cache location contains a version of a data resource which is more current than that in the shared data storage resource (DASD).

A primary and overiding thrust of a multi-system with shared data such as that illustrated in FIG. 2 is to reduce the number of lock and unlock calls which result in messages to the global lock manager for transaction locking and cache coherency. The technique of the invention, called LP locking, saves locking calls when the unit of ownership of the data resource by a transaction is the same as the unit of caching that resource by the cache manager. The local lock manager can hide the distinction between the L-type lock which is issued to serve a transaction interest and the P-type lock which is issued on the same data resource for cache ownership. The L and P locks for the data resource, although distinct to a local lock manager are known in the invention as a single lock—an LP lock—by the global lock manager. The global lock manager knows only that the owner of the LP lock is a local lock manager and that the lock mode is the resultant mode of all L and P locks maintained by the owning local lock manager of the data resource. A local lock manager can grant an L or P lock on a data resource locally if the combined lock mode of the L and P locks held on the same data resource is equal to or higher than the requested mode. Also, a local lock manager can suppress the unlock call of an L (or a P) lock to the global lock manager if the P (or the L) lock is still held in the same or higher lock mode. This saves the lock and unlock calls from a local lock manager to the global lock manager, thereby saving messages between them.

It is assumed in this invention, that the global and local lock managers communicate by way of some efficient message procedure, for example, by message batching. However, all messages have processing overhead, and batching increases latency. Both processing overhead and latency impact transaction lock hold time and response time. Therefore, the optimization to save lock and unlock calls to the global lock manager is an important performance attribute of the invention.

Importantly, L and P locks on a data resource cannot be treated as hierarchical locks since the order of their acquisition is unpredictable. For example, when a cache manager prefetches pages prior to transaction usage of those pages to improve I/O performance for sequential scan of data, the P locks on those pages would be acquired before the L locks are acquired; for a typical random access of data by a transaction, the L lock on a page would be acquired before the P lock is acquired, assuming the page is not already cached.

THE L LOCK

A transaction obtains ownership of a data resource by way of a logical (L) lock. Hereinafter, it is assumed that the data resource is a page in a database. However, the inventors contemplate that transaction interest may be expressed in other database units. In requesting a lock, the transaction provides the name of the page being locked as the lock name, the type of lock, which for a transaction, is an L lock, the mode necessary to implement a contemplated operation, and identification of the transaction or process which will own the requested lock. In the following discussion, it is assumed that the transaction acquires an L lock in either the shared (S) mode to read a page or in the exclusive (X) mode to update a page. This is for simplicity of the explanation and is not intended to limit the practice of the invention to a dual-mode locking scheme. Compatability rules for S and X-mode locks are as follows: If a lock is held in S mode and an S mode is subsequently requested by another transaction, the subsequent request is compatible; if an S mode is requested and an X-mode lock is held, the subsequent request is incompatible and the requesting transaction will be placed in a wait state until the holder unlocks the data resource by surrendering or downgrading its lock. When a lock is held, a subsequent request for an X-mode lock is considered incompatible, no matter what the mode of the held lock is.

The compatability of lock modes is contrasted with the concept of resultant lock mode discussed above which is a mode value derived by a local lock manager from the lock modes of locks held on a data resource for which a lock has been requested. Particularly, if a transaction requests a DBMS to grant a lock on a data resource, which is already held in the DBMS and the requested mode is less than or equal to the resultant lock mode, it is possible for the local lock manager to save a lock call to the global lock manager by granting the lock locally. This is because the global lock manager already "knows about" the lock. In this regard, if the transaction requests an S-mode lock on a data resource which is already L locked, the local lock manager will compute the resultant mode of the held locks as S if no held lock has a magnitude exceeding S. If an X-mode lock is held, the resultant lock mode is deemed to be X.

THE P LOCK

The cache manager in a DBMS which caches a page obtains cache ownership of a page via a P lock. It is observed that the P lock is a different type lock than the L lock because the purpose of its ownership is different. For example, a P lock requested in exclusive mode in the system should not conflict with the L locks for the same data resource on that system. The P lock is acquired to ensure cache coherency between systems and the L locks are acquired for intra- and inter-system isolation and serialization of transaction access to a resource. In the invention, the distinction between L and P locks is kept only at a local lock manager level and the global lock manager is unaware of this distintion.

In providing a P lock request to the local lock manager, the cache manager specifies the lock name of the page which is being, together with a lock name extension which makes it different from the L lock name for the same page, the lock type, the lock mode, and cache-manager-identification for this system. The cache manager must acquire a P lock for a page before it caches that page in the cache for DBMS. The P lock is held for so long as the page is cached, implying that when different transactions use a page already in the system they do not pay the overhead of acquiring the P lock. The cache manager acquires the P lock in share mode when a page is to be read, and in exclusive mode when the page is to be updated. The compatability rules for the P lock are the same as for the L lock, with the sole distinction that they apply only between DBMS's, there being only one P lock which is owned by the cache manager of any DBMS.

COHERENCY PROTOCOL FOR NO-FORCE-AT-COMMIT IN A PRIOR ART SYSTEM

A cache- or buffer-interest lock is typically used to support coherency of a changed page in a system environment such as that illustrated in FIG. 2 where multiple DBMS's have respective caches and each DBMS uses a no-force-at-commit policy. In this regard, a cache manager always acquires a P lock when it caches a page in its DBMS.

In the prior art hierarchical locking system, a DBMS must acquire a P lock in a certain mode before it can issue L locks on the identified data resource. Under the hierarchical arrangement, the P lock call is communicated to an interest manager. The interest manager knows from its table which system(s) hold the lock and therefore have buffered that page. If the P lock is held in share mode, the page can be buffered in multiple systems, if in exclusive mode, the page can be buffered in only one system. For the latter case, the interest manager's directory entry would provide the identification of the system which has the changed page cached. Next is given an example of how the prior art system might employ a P lock coherency scheme under a no-force-at-commit policy.

Assume that a DBMS S1 has page A buffered as a changed page. Therefore, the interest manager's lock table entry would show that the resource lock manager of S1 holds the P lock on page A in state X. Also assume that the transaction which has updated page A has committed. In this case, page A will not necessarily have been written to DASD as the DBMS is implementing a no-force-at-commit policy. Now, the transaction in the second DBMS S2 needs to read page A. An L lock would be requested on page A in the share state, eliciting a P lock request from system S2 to the interest lock manager in the share state. The interest manager would detect the lock conflict and send a message to the resource lock manager in S1 informing it of the lock conflict for page A by another system. The resource manager in system S1 would do the following processing for the P lock request: It would invoke its buffer manager's lock-conflict routine with the following parameters: (a) lock name of the page for which the conflict occurred, i.e., page A, (b) the requested lock mode, i.e., S, and (c) the identification S2 of the requesting system. The buffer manager of system S1 would resolve the P lock conflict by writing the page to DASD (if the versions differ) and sending the page by way of a communication link to system S2. Following completion of the DASD I/O, the buffer manager could request its resource lock manager to change its P lock mode to S, which would continue to buffer page A in S1's buffer. The resource lock manager in S1 would pass the new P lock mode for page A to the interest manager. The interest manager would update its directory to note that DBMS S1 holds the P lock on page A in the S mode and would grant the P lock in S mode to the DBMS S2. Thus, the current copy of changed page A and S1 is propagated to S2 and S1 follows a no-force-at-commit policy. This maintains the coherency of a changed page in a multiple DBMS environment by way of hierarchical P locking when all DBMS's follow a no-force-at-commit policy.

Therefore, it will be appreciated that use of the hierarchical locking scheme of the prior art would constrain a DBMS to first possess a P lock on a data resource before granting L locks on the data resource. Thus, L lock requests for unbuffered pages would have to be suspended while the resource lock manager engages in a P lock request/grant process with the interest manager.

LP LOCKING

In invention, LP locking is used to invest a local lock manager with the power to issue locks locally. Thus, a local lock manager is empowered to engage in a request/grant exchange with the global lock manager in response to the first lock request for an uncached data resource without regard to whether the request is for an L or P lock. The ownership distinction between L and P locks is important only for the local lock manager; the global lock manager is interested in lock ownership only at the local lock management level. Therefore, if an L lock request is received for a page which is not cached, the local lock manager can request an LP lock from the global locking manager, anticipating that a P lock request will follow from its own cache manager. Further, if an L lock is already held on a page and a P lock request is made for the same page and in a mode which is less than or equal to the resultant mode of the existing L lock, the local lock manager can grant the P lock without communicating with global lock manager. The resultant mode of the L and P locks is determined by the lock modes in which they are held by the transactions and the cache manager of the "owning" DBMS. Thus, a local lock manager hides the distinction between the L and P locks for the same data resource from the global lock manager. Although distinct at the local level, the distinction between L and P locks is blurred at the global level where they are merged into a single LP lock. The global lock manager knows the owner and mode of the LP lock. The invention permits a local lock manager to grant an L lock on a page locally if the resultant mode of L and P locks held on the page is greater than the requested mode according to the magnitude relationship given above. The same is the case when the P lock is requested.

OPERATION OF THE INVENTION

Figure 4:
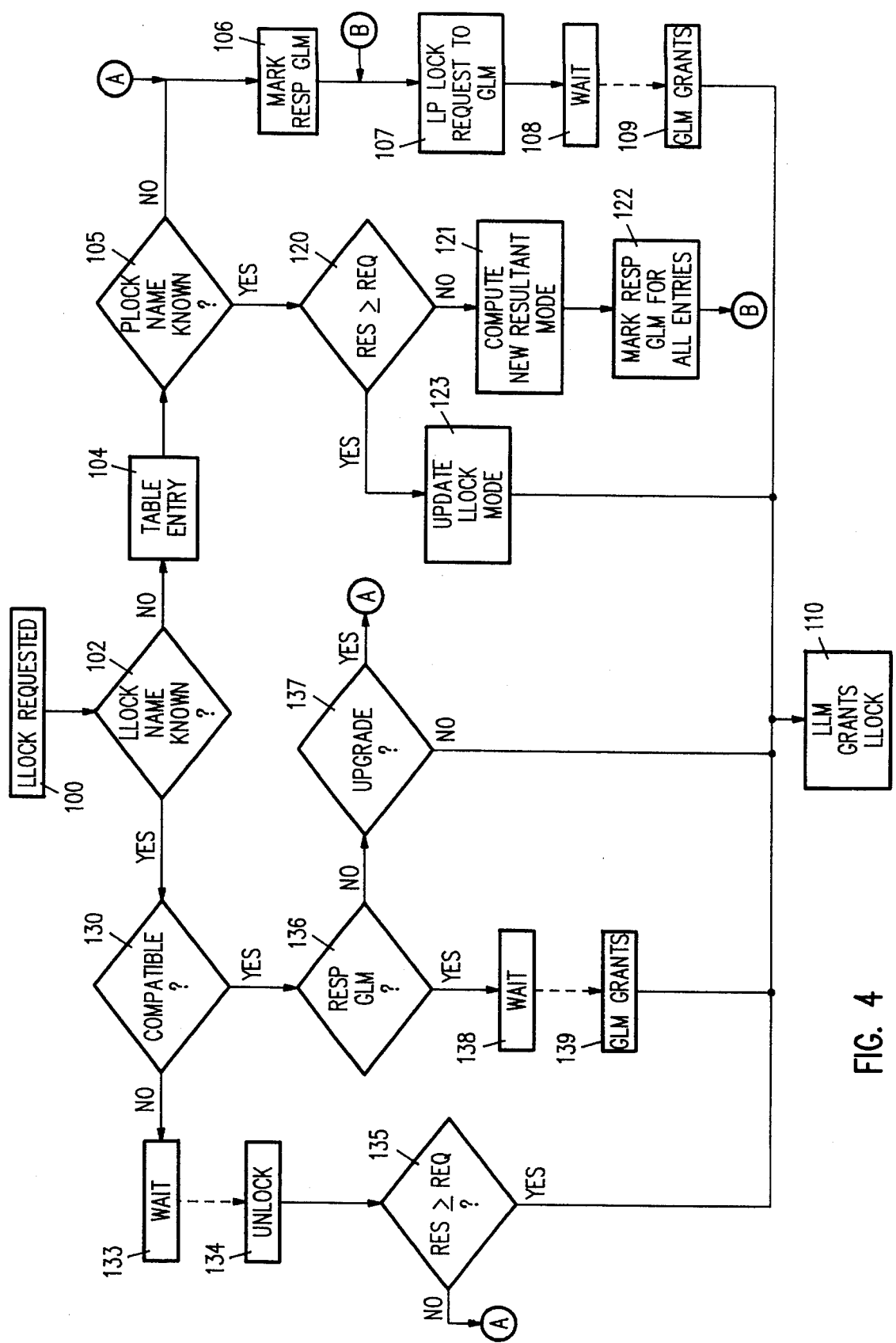
FIG. 4 illustrates the method employed by the invention in response to a request for an L lock.

With reference to Table I and to FIGS. 2–4, the operation of the invention in responding to an L lock request will next be described. Assume that a local lock manager such as 36 perceives a lock request from the transaction 49. A request 100 is made in the form of a procedure call to the local lock manager. The logic of the local lock manager responds according to the invention by taking a first decision 102 wherein the local lock manager inspects its lock table to determine whether the name of the L lock is known. Assume that no L lock for the page named in the lock request is in the table. The negative exit will be taken from decision 102 and a table entry corresponding to the entry 82 will be made and entered into the local lock table 80. Next, the table is searched for a P lock for the named data resource in 105. Assuming that the page is not yet cached and that the cache manager has not yet forwarded a P lock request for the page, the negative exit is taken from 105, the RESP GLM field of the entry in the local lock table is marked and the local lock manager sends a request 107 to the global lock manager in the form of a message. The local lock manager waits at 108 until receiving a message 109 from the global lock manager granting the requested lock. When the grant is received, the local lock manager deletes the mark in the RESP GLM field of the lock entry, queues the requesting transaction to the H field of the entry and grants the L lock to the transaction at 110.

Assume now that the request for an L lock has been received under the condition that only a P lock is found in the local lock managers's table for the named page. In this case, the positive exit is taken from the decision 105, upon which the local lock manager will determine the resultant mode of the P lock in the table and compare it against the mode of the requested L lock. If the requested mode has a greater magnitude than the resultant mode of the P lock, the negative exit is taken from the test 120, a new resultant mode equal to the requested mode is computed which would be requested from GLM. Then, a mark 122 is placed in the RESP GLM field for the requested L lock and the logic enters the sequence 107, 108, 109, 110 through logic point B. In this sequence, the global lock manager, upon receiving the LP lock request 107 will find an LP lock entry for the requesting DBMS which permitted the local lock manager to grant the P lock in the table. Now, the request to the global lock manager seeks to upgrade the magnitude of the mode of the previously-granted LP lock. In this case, if there are no other LP lock entries for the identified data resource, the existing LP lock for the requesting local lock manager will have its mode upgraded. This will be communicated by the global lock manager on a grant message 109. Upon receipt of the grant message, the local lock manager will remove the mark 122 from the RESP GLM field of the L lock entry and grant the L lock at 110.

Assume now, when the request 100 is received, another L lock for the named data resource is found in the local lock manager's table. In this case, the positive exit is taken from the test 102 and the mode of the requested lock is tested against the mode of the granted lock at 130 to determine whether they are compatible. Assuming that the requested mode is incompatible with the previously-granted L lock, the local lock manager queues the requesting transaction in the R field of the L lock table entry and the transaction waits at 133 until the data resource is unlocked by the owning transaction. Upon unlocking at 134, the mode of the requested L lock is subjected to a test 135 of its magnitude relative to the resulting magnitude of any other locks on the named data resource remaining in the local lock manager's table. Assuming surrender of the L lock first encountered at 102, the unlock 134 will have placed a Null value in the Mode field of the L lock entry. On the other hand, if the previously-locking transaction has merely downgraded the mode of the existing L lock, the magnitude value will have been lowered. The test 135 will therefore compare the mode value of the requested lock against a resultant mode value calculated according to Table I. If the resultant mode value is greater than or equal to the requested value, the positive exit is taken from the test 135, the requested mode is placed in the Mode field of the L lock entry and lock is granted at 110.

Returning once more to the test 130 and assuming that the mode for the requested L lock is compatible with the mode of the existing L lock on the identified data resource, the positive exit is taken from the test 130 and the RESP GLM field of the L lock entry is inspected at 136. If the field is unmarked, the mode of the requested lock is compared against the mode of the granted lock at 137 to determine whether the resultant mode must be upgraded to the greatest magnitude of the compatible modes of L and P locks. If not, the requesting transaction is queued to the H field of the L lock entry and the lock is granted. If upgrade is required, the positive exit from the test 137 carries the operation to entry point A in the local lock manager logic and results in a message exchange between the local lock manager and global lock manager to upgrade the mode of the LP lock via steps 106–109, following which the requestor is queued to the H field of the L lock entry and the lock is granted at 110.

If the test 136 shows that a message from the global lock manager is expected in respect of the L lock entry, the positive exit is taken, the transaction is placed in wait state at 138 until a grant message is received from the global lock manager 139. Following this, the mark is removed from the RESP GLM field, the requesting transaction is queued to the H field and the lock is granted at 110.

Figure 5:
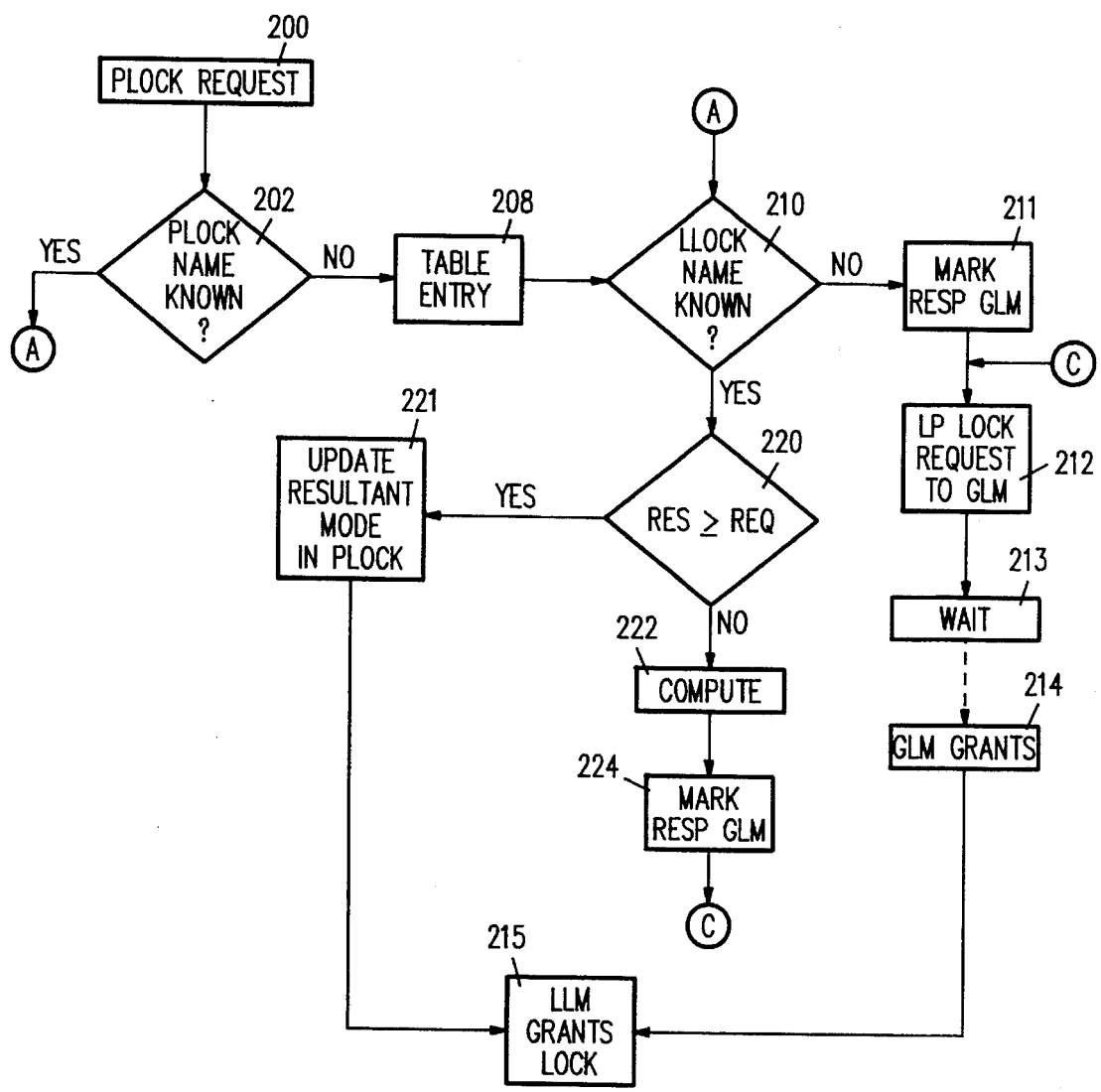
FIG. 5 illustrates the method employed by the invention in response to a request for a P lock.

The operation of the invention in response to a P lock request is illustrated in FIG. 5; refer also to FIGS. 2 and 3 for an explanation of this operation. FIG. 5 illustrates logic inherent in the local lock managers 46, 47 for response to request for a P lock from a cache manager 38, 39. A request is received at 200. The local lock manager consults its local lock table to determine at 202 whether the P lock for the named data resource has been granted. Assume that the cache manager has not yet cached this page, in which case the negative exit will be taken from 202, a P lock entry will be made and entered into local lock manager's table at 208 and the table will then be scanned for an L lock entry for the named data resource.

Assuming that no L lock has been requested for the named resource, the negative exit is taken from 210, the RESP GLM field of the P lock entry is marked in the local lock table at 211, an LP lock request is sent at 212, and a reply is awaited from the global lock manager at 213. Once the requested LP lock has been granted by a message 214, the RESP GLM field of the P lock entry is cleared and the P lock is granted at 215.

Returning to test 210, assume that an L lock entry for the named data resource is found in the local lock table. The positive exit is taken and the resultant mode of the holder's entries is tested against the requested mode in 220. If the requested mode is not greater than the resultant mode, the positive exit is taken from the test 220, the requested mode value is placed in the Mode field of the requested P lock, and lock is granted at 215.

Assuming that the requested mode for the P lock is greater than the resultant mode tested at 220; a new resultant mode is computed which includes the requested lock mode, the RESP GLM field of the P lock entry in the local lock table is marked at 224, and an updating of the LP lock mode is effected beginning at C in FIG. 5. When the updating of the LP lock is completed, the RESP GLM field of the P lock entry is cleared and the P lock is granted at 215.

Returning to test 202, assume that the P lock request 200 is submitted by the cache manager in order to update the mode of an existing P lock. In this case, the positive exit is taken from test 202 and the logic is re-entered at A in FIG. 5.

COHERENCY WITH LP LOCKING

In the coherency protocol discussed above in respect of the no-force-at-commit policy using the P lock in a prior art hierarchical locking structure, a description was given of how P locks achieve coherency of a changed page in multiple buffers. Generally, inter-system coherency of a changed page is maintained in the same way via LP locks.

However, a few differences do occur as a result of treating the L and P locks on a page as a single lock at the global lock manager.

First, without LP locking, some prior art systems may require the global lock manager to detect lock conflict for L and P locks for any page when a corresponding incompatible lock request is made from another system. With LP locking, the global lock manager would detect a lock conflict on a page when an incompatible L or P lock request is made to the local lock manager of another system. The receiving local lock manager would forward an LP lock request having a mode conflicting with the existing LP lock maintained by the global lock manager for the same page for a different system. In this case, the inventors contemplate that the global lock manager would invoke a lock conflict protocol by, for example, sending a lock conflict message to the local lock manager owning the LP lock.

In the case above where LP locking is not practiced and the global lock manager received L and P lock requests, a local lock manager would invoke its cache manager's lock conflict routine upon receiving a lock conflict message for a P lock request from the global lock manager. Because the L and P locks are maintained separately by the global lock manager in this case, the local lock manager would not have to be aware of the tie in with the L lock as explained below for LP locking.

With LP locking according to the invention, an owning local lock manager upon receiving the lock conflict message from the global lock manager would invoke its cache manager's lock conflict routine after any L locks on the identified data resource become compatible with the mode of the requested LP lock. Assume, for example, that a transaction in system S1 holds an X-mode L lock to update page A and the cache manager in S1 holds an X-mode P lock because page A has changed. Assume further that a transaction in system S2 requests an L lock on page A, in which case the local lock manager for system S2 would send an LP lock request to the global lock manager. Upon receiving the request from system S2, the global lock manager would send a lock conflict message to system S1. Upon receiving the message, the local lock manager in system S1 would invoke its cache manager's lock conflict routine after the transaction in system S1 releases its L lock, that is, after the transaction commits. This ensures that the cache manager's lock conflict routine would transfer only that version of the page which has committed updates.

Consider an example when a local lock manager would invoke its cache manager's lock conflict routine immediately. First, assume that in system S2 a transaction or the cache manager causes the local lock manager to generate an S-mode request for a LP lock on page A. Assume further that in system S1, page A is P-locked in X-mode and either not L-locked or L-locked in S-mode. In this case, the cache manager of system S1 has the updated version of page A cached, with the page either being read by a transaction or not used at all. The changes to the page are already committed, therefore the page can be transferred to another system without waiting for any transaction to commit. However, if the LP lock requested by system S2 is in X-mode, the local lock manager in system S1 would wait for the transaction holding the L lock on the page in S-mode to release the lock before invoking cache manager's conflict routine.

The inventors have described a technique which saves messages for transaction locking and cache coherency when multiple instances of a database system (DBMS) share data by a shared data storage. In a multi-system environment, the locking function requires coordination among the multiple DBMS's, which is typically done via messages between systems. Messages have processing overhead and increase latency. This impacts transaction lock hold time and response time. Therefore, savings of lock and unlock calls is an important performance consideration. The technique of the invention, called LP locking, saves messages for locking when the unit of ownership of a data resource by a transaction is the same as the unit of caching that resource by the cache manager. The local lock manager hides the distinction between L and P locks for the same data resource from the global lock manager. The L and P locks for data resource, though distinct at the local lock manager, are known as a single LP lock at the global lock manager. The local lock manager can grant a lock locally based on the ownership of another related lock or suppress an unlock call since the information kept at the global lock manager does not change.

While the invention has been described with respect to a preferred embodiment, it is to be understood by those skilled in the art that various changes in detail may be made to the invention without departing from the scope, spirit and teaching presented herein. Accordingly, the invention is to be limited only as specified in the following claims:

We claim:

1. A method for non-hierarchical locking of data resources in a shared data system including multiple database management systems (DBMS) connected to one or more data storage devices and to a global lock manager, the global lock manager receiving and granting requests for locks, each DBMS including a data cache, a cache manager, and a local lock manager for receiving, processing, and granting requests for a first type of lock (L lock) that serializes transaction access to data resources and for a second type of lock (P lock) for caching of a data resource in the cache, the method including the steps of:

providing a request from a transaction to a local lock manager of a DBMS for an L lock on a data resource, and providing a request to the local lock manager from the cache manager of the DBMS for a P lock on the data resource;

a. responsive to receipt of either the L lock or the P lock, whichever is received first, by the local lock manager, transmitting to the global lock manager a request for a third type of lock (LP lock) that indicates interest on the part of the DBMS in the data resource, wherein said third type of lock hides from the global lock manager the type of the first received lock as being an L lock or a P lock; and b. upon receipt by the local manager of a grant of the LP lock from the global lock manager, the local lock manager granting the request for the L lock or the P lock whichever is first.

2. The method of claim 1, locks being granted in at least a first mode (X mode) denoting exclusive use of a data resource or a second mode (S mode) denoting shared use of a data resource, the X mode being of a relatively higher magnitude than the S mode:

wherein, step (a) includes transmitting the request for the LP lock as a request in X mode, if the first request denotes X mode or in S mode if the first request denotes S mode; and wherein, the grant received in step (b) is in the mode of the first request;

the method further including:

(c) responsive to receipt of a subsequent request for a lock of any type by the local lock manager for the data resource, determining a resultant mode of all locks held on the data resource at the DBMS, the resultant mode being the highest magnitude of the held locks;

(d.1) if the subsequent request is for a lock with a mode having a magnitude greater than the magnitude of the resultant mode, transmitting a request to the global lock manager for the LP lock on the data resource in the mode of the subsequent request;

(d.2) upon receipt by the local lock manager of a grant of the LP lock in the requested mode, the local lock manager granting the subsequent request; otherwise, (e) the local lock manager granting the subsequent request.

3. A method for inter-system data lock management in a combination with a global lock manager for processing system lock requests, one or more database storage resources, and a plurality of database management systems, each database management system (DBMS) including a cache for caching data resources at the DBMS, a cache manager, and a local lock manager coupled to the global lock manager, the method including the steps of:

maintaining at a first DBMS a list of locks granted by the first DBMS's local lock manager, the locks including one or more locks of a first type (L lock) each L lock being granted to a respective transaction for a data resource, the plurality of locks further including one or more locks of a second type (P lock), each P lock being granted to the cache manager, each lock of the plurality of locks naming a data resource to which it applies;

in response to receipt by the local lock manager of a request for a lock of either the first or the second type for a data resource not named in the table;

sending a request from the local lock manager to the global lock manager for a lock of a third type (LP lock) for the data resource while hiding from the global lock manager the type of lock request received by the lock manager, the LP lock denoting interest of the first DBMS in the data resource; and placing the lock of either type in the list; upon receipt of a grant of the LP lock from the global lock manager, granting the requested lock of either type by the local lock manager.

4. The method of claim 3, further including:

maintaining at the global lock manager a list of LP locks granted by the global lock manager, each LP lock denoting interest of a respective DBMS in a respective data resource;

at the global lock manager:
  (1) granting the requested LP lock if it is not in the list;
  (2) granting the requested LP lock if the list includes an LP lock owned by a second DBMS and the listed LP lock is compatible with the requested LP lock; or
  (3) if the list includes an LP lock owned by a second DBMS and the listed LP lock is incompatible with the requested LP lock, granting the requested LP lock after the listed LP lock is released by the second DBMS; and
  (4) listing the requested LP lock.

5. The method of claim 3, wherein locks are granted in a plurality of modes, at least one mode being incompatible with other modes, the method further including:

maintaining at the global lock manager a list of LP locks granted by the global lock manager, each LP lock denoting interest of a respective DBMS in a respective data resource; and
  (1) the global lock manager comparing the requested LP lock with LP locks in the list;
  (2) the global lock manager detecting incompatibility between the mode of the requested LP lock and the mode of a granted LP lock in the list, the granted LP lock denoting interest of a second DBMS in the resource;
  (3) the global lock manager sending a lock conflict message to the second DBMS;
  (4) the second DBMS conducting a lock conflict resolution process with the first DBMS to resolve the conflict and transfer the data resource to the first DBMS.

6. The method of claim 1, further including:

receiving a second request for a lock of either type by the DBMS local lock manage for the data resource; and the local lock manager granting the second request without transmitting to the global lock manager a request for an LP lock.

* * * * *

UNITED STATES PATENT AND TRADEMARK OFFICE
CERTIFICATE OF CORRECTION

PATENT NO. : 5,551,046
DATED : August 27, 1996
INVENTOR(S) : Mohan et al

It is certified that error appears in the above-identified patent and that said Letters Patent is hereby corrected as shown below:

ON THE TITLE PAGE

[56] References Cited

U.S. Patent Documents

| | | | |
|---|---|---|---|
| 4,399,504 | 8/1983 | Obermarck et al | 364/200 |
| 4,480,304 | 10/1984 | Carr et al | 364/200 |
| 4,698,752 | 10/1987 | Goldstein et al | 364/200 |
| 4,716,528 | 12/1987 | Crus et al | 364/300 |
| 4,727,485 | 2/1988 | Keshlear et al | 365/200 |
| 4,965,719 | 10/1990 | Shoens et al | 364/200 |
| 5,256,218 | 10/1993 | Nitta | 395/725 |

Japanese Patent Information Organization, Abstract of Japanese Patent Application, 88JP-16302, 6/30/88.

Eswaran, "Locking Technique in a Relational Database: Locking on Intents", IBM TDB, Vol. 18, No. 7, 12/75, p.p. 2324-2326.

Mohan, "ARIES: A Transaction Recovery Method Supporting Fine Granulary Locking and partial Rollbacks Using White-Ahead Logging", IBM Research Report, JR 6649(6360) 1/23/89.

Wang, et al "Cache Consistency and Concurrency Control in a client/Server DBMS Architecture", AMC Reprint 0-89791-425-2/91/0005/0367 p.p. 367-376, 1991.

Dias et al, "Integrated Concurrency-Coherency Controls for Multisystem Data Sharing", IEEE Reprint 0098-5589/89/0400-0437, p.p. 437-448, 1989.

Kronenberg et al "Vaxclusters: A Closely - Coupled Distribution System", ACM Reprint 0734-0261/86/0500-0130, p.p. 130-146, 1986.

UNITED STATES PATENT AND TRADEMARK OFFICE
CERTIFICATE OF CORRECTION

PATENT NO. : 5,551,046
DATED : August 27, 1996
INVENTOR(S) : Mohan et al.

It is certified that error appears in the above-identified patent and that said Letters Patent is hereby corrected as shown below:

Peterson, et al "Log Write-Ahead Protocols and IMS/VS Logging', Proceedings Second ACM SIGACT-SIGMOD Symposium on Principles of Database Systems, p.p. 217-243, March, 1983.

Strickland et al "IMS/VS: An Evolving System', IBM System Journal, Vol. 21, No. 4, 1982, p.p. 490-510

Signed and Sealed this

Twenty-fourth Day of March, 1998

*Attest:*

BRUCE LEHMAN

*Attesting Officer*     *Commissioner of Patents and Trademarks*